Oct. 1, 1940.  R. MÜLLER  2,216,402
METHOD OF PRODUCING PURE MAGNESIUM COMPOUNDS
Filed April 26, 1937
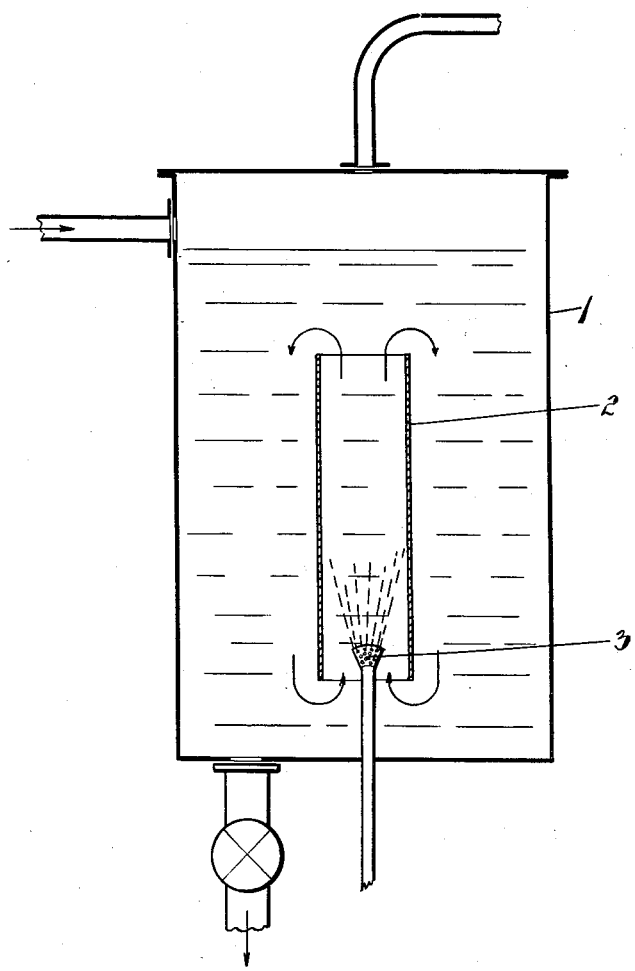
R. Müller,
INVENTOR
By Glascock Downing & Seebold
ATTYS Patented Oct. 1, 1940

2,216,402

UNITED STATES PATENT OFFICE 2,216,402

METHOD OF PRODUCING PURE MAGNESIUM COMPOUNDS

Robert Müller, Leoben, Styria, Austria, assignor to the firm Gesellschaft Zur Verwertung Chemisch Technischer Verfahren, Waduz, Liechtenstein, a company of Liechtenstein Application April 26, 1937, Serial No. 139,085
In Austria May 9, 1936

6 Claims. (Cl. 23—91)

This invention relates to the production of pure magnesium compounds, and more particularly magnesium oxide. The refining of magnesite and dolomite for the purpose of obtaining pure magnesium compounds has been attempted in various ways, among others, for example, by dissolving crude or burned magnesite in carbonic acid under pressure. Only the magnesium goes into solution, as bicarbonate, while the impurities remain behind in an undissolved state. However, this method is not readily practicable, since the solubility of magnesite in carbonic acid is but slight.

The dissolving of the native rock may be effected in the known manner in aqueous hydrochloric acid. In this case in addition to the magnesium there become dissolved, from among the impurities, calcium, manganese, iron, and aluminium. Silicat and silicate remain undissolved.

With the exception of calcium, these impurities can be precipitated out of the solution by means of caustically burned magnesite, synthetically produced magnesium oxide, or waste products containing this compound. For this purpose, however, it is necessary that iron and manganese be present in the higher degrees of oxidation.

Oxidation by means of atmospheric oxygen can only be effected to an imperfect extent, and it becomes necessary to add suitable oxidizing agents (nitric acid, chlorine).

Since in the reaction

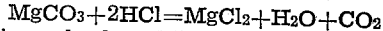

$$MgCO_3 + 2HCl = MgCl_2 + H_2O + CO_2$$

water is evolved and the aqueous hydrochloric acid used likewise contains about 70% of water the solution obtained contains at the most 20% of $MgCl_2$ and must be concentrated by evaporation before further utilization.

The process according to the present invention diminishes these drawbacks in the following manner: For the dissolving of the native rock there is employed gaseous acid, for example hydrochloric acid, to which a calculated quantity of steam is added. The temperature of the gas mixture amounts to 100–500° C. The gaseous hydrochloric acid may be generated in a quartz burner by the direct combining of the elements chlorine and hydrogen, or alternatively in a coke oven into which steam and chlorine are introduced, which affords the additional advantage that the hydrochloric acid gas is raised by the heat of combustion to the temperature of 100–500° C. required for the reaction.

The reaction is preferably carried out in a tower made from suitable resistant material which is charged with crude ore and into the bottom quarter of which hydrochloric acid gas and steam are blown in. The lower portion of the reaction material becomes heated to about 150–200° C., at which temperature the reaction of the crude mineral with the hydrochloric acid proceeds very rapidly. The tower is made of such height that all the hydrochloric acid used is absorbed in its passage through the crude mineral, and only a certain amount of steam, if anything, escapes at the top. From the lower end of the tower, in which there is preferably provided a sump in which the solution remains for some time in contact with lumps of the crude mineral so that the last traces of hydrochloric acid may become chemically combined, the crude lye flows off continuously, and may then be separated from the insoluble concomitants in clarifying tanks or in filters.

For completing the neutralization of the lye, on the one hand, and for the complete utilization of the acid-containing gases traversing the tower, on the other hand, a circulation of the lye may be provided, by returning a portion of the lye flowing out at the bottom of the tower, by means of a pump, into the top of the tower. This portion of the lye, in trickling down through the tower in the first place assists the reaction of the residual HCl with the crude mineral, and in the second place becomes itself further concentrated since the temperature prevailing in the tower is in excess of 100° C.

A cooling of the HCl-containing calcining furnace gases, which may under certain circumstances enter the tower at too high a temperature, may also be effected by circulating the lye, if desired or necessary with the addition of water. For this purpose the crude lye leaving the tower at the bottom is returned into the tower at the upper end, by means of pumps, and becomes concentrated by the entering hot gases as it trickles down through the tower.

More particularly when the operation of the dissolving tower is first started, the dissolving process may also be carried out by the combined action of HCl gas and aqueous acid fed in from the top.

By adjusting the relative proportions of acid and $H_2O$ supplied, and the temperature, the concentration of the crude lye may be varied at will within wide limits. The concentration may be increased to the point of crystallization, and in this case higher temperatures must be employed to keep the lye in a liquid state. In order to obtain iron and manganese in their higher degrees of oxidation the chlorine-hydrogen burner may be so adjusted that a sufficient excess of chlorine passes into the reaction chamber. In this manner complete oxidation of the said concomitants is effected.

The hydrochloric acid gas may also be obtained in the course of the calcining process to be described at a later stage, and be returned into the tower in uninterrupted circulation.

In place of hydrochloric acid it is also possible to employ nitric acid for the dissolving, and this has the advantage that the acid itself acts as a powerful oxidizing agent and enables the addition of small quantities of chlorine to be dispensed with.

The clarified and highly concentrated lye obtained in this way may then be purified in either of two ways, namely:

(1) By the addition of caustic magnesium oxide up to the point of alkaline reaction, in which case, as mentioned above, all impurities with the exception of calcium are precipitated out and can be filtered off, or (2) By cooling the highly concentrated lye. In this case the $MgCl_2.6H_2O$ or the nitrate crystallizes out in a pure state, while the concomitant impurities, including calcium, remain behind in the mother liquor. The crystal mass is freed from the mother liquor in a suction filter, re-washed with a small quantity of saturated $MgCl_2$ solution or with cold water, and then converted into MgO, for instance by calcining with superheated steam, the hydrochloric acid being thereby recovered in the gaseous state and returned into the dissolving tower.

*Crystallization.*—Crystallization of the $$MgCl_2.6H_2O$$

and/or of the corresponding nitrate is effected by cooling the hot saturated lye. The dissolved impurities, including $CaCl_2$, remain in the mother liquor as long as their saturation concentration is not reached. The crystals obtained are separated off in a suction filter, or preferably in a centrifuging apparatus; to get rid of the last traces of mother liquor the crystals are washed with small quanties of cold saturated $MgCl_2$ solution or as cold water as possible, and then immediately once more freed from the solution.

The purification by crystallization may be very considerably simplified and improved by a preliminary precipitating out of the impurities (with the exception of calcium) by means of caustic magnesite.

For the precipitation it is necessary to employ approximately 50–60 grammes of caustically burned crude mineral for every litre of hot saturated lye treated. The MgO contained therein does not go to waste, but increases the quantity of Mg salt formed, by precipitating out equivalent quantities of impurities in the form of hydroxides and becoming itself dissolved.

The crystal mass is heated in open pans, and first freed from water approximately up to the tetrahydrate, only slight quantities of HCl being driven off. The loss of HCl can be still further kept down by carrying out the evaporation in a vacuum.

The lumpy mass of $MgCl_2$ poor in water thus obtained is then placed in special calcining furnaces for the purpose of converting into MgO and recovering the HCl, in which at a temperature of 300–1000° C. the decomposition of the $MgCl_2$ in accordance with the equation $$MgCl_2+H_2O=MgO+2HCl$$

is effected by means of superheated steam.

When this process is properly carried out the $MgCl_2$ does not melt, but remains solid, owing to the rapidly proceeding decomposition, and can be practically completely de-acidified in from 10 to 30 minutes time.

Apart from steam, the escaping gas contains exclusively HCl in high concentration, so that it may be returned into the dissolving tower without any further treatment.

The calcining furnace consists broadly of a shaft into which the material is charged from the top, while the superheated steam is blown through the mass from below. The steam is thus caused to travel in counter-current relation to the material upon which it acts, steam at a high temperature being brought in contact with almost completely calcined material in the lower part of the shaft, while cooled-off steam laden with HCl acts upon fresh material in the upper part of the shaft. In this manner there is also effected a heat exchange which enables the heat introduced into the furnace to be utilized to the fullest possible extent, and the hydrochloric acid vapours to be cooled off to such an extent that they do not pass into the tower at a higher temperature than is necessary.

In the above-described concentrating of the lye by repeated recycling into the dissolving tower the calcium content of the lye increases to such an extent that the crystallizing out of the pure magnesium salt becomes in time impossible.

As is well known, it is impossible to effect quantitative precipitating out of calcium with sulphuric acid or sulphates in dilute solutions, on account of the relatively high solubility of $CaSO_4$. Only after days or weeks does a precipitate become formed, and even then a part of the calcium remains in solution. It has been found, however, that the calcium can be practically completely precipitated, and that in a very short time, by the addition of sulphate ions, provided the calcium-containing solution is saturated with magnesium chloride, it being essential that the precipitation be carried out with a concentration of the lye corresponding to a specific gravity of not less than 1.35, and at a temperature which is not less than 70° C. and which may be increased up to the boiling point of the lye.

For the precipitation there are employed either sulphuric acid or sulphates (preferably magnesium sulphate) which are acidified with a certain amount of sulphuric acid.

After the addition of a calculated amount of sulphate or sulphuric acid, the mother liquor may be directly returned into the dissolving tower for further concentration. The $CaSO_4$ separating out becomes added to the sludge of insoluble residues formed in any case in the tower.

In the practising of the above-described process both calcium and magnesium salts are formed as a result of the dissolving of dolomite or the like in nitric acid or other acids, and/or in the treatment of the same with acid vapours. It has been found that the process may with advantage be modified in such a manner that when the dissolving is effected by so-called alkaline neutralization only the calcium becomes dissolved. For this purpose the dolomite or calcareous magnesite is caustically or dead burned (800–1400° C.), and the deacidified material stirred up with water, the material becoming thereby decomposed, with hydration and simultaneous libration of heat, to a solid powder, or in the presence of water in excess to a sludge. Into this hot suspension there is then introduced, in a dissolved state, in uniform distribution, and with constant stirring, the quantity of an acid, for instance nitric acid, equivalent to the calcium content, this acid being introduced slowly and in such a manner that the precipitate is constantly of alkaline reaction which can be checked by the use of an indicator. The acid may also be blown in a gaseous state, either pure or in commixture with some other gas such as air or steam, into the suspension through a gas distributor, whereby a vigorous and thorough washing is simultaneously effected.

For the carrying out of the process there may be employed for example the following type of apparatus, reference being had to the accompanying drawing showing the apparatus in diagrammatic vertical section. In a large tank 1 filled with the suspension there is disposed a tube 2 which is open at both ends, and into which there are blown, through a gas distributor 3, acid vapours, if desired in commixture with other gases. The ascending gas bubbles carry the liquid with them and effect circulation and vigorous and thorough intermixing of the liquid. The escaping gases are preferably returned in circulation into the system, so as to ensure complete absorption of the acid.

Exhausted tests have shown that, as long as the described mode of operation is adhered to, practically only calcium salts become formed, while the magnesium remains undissolved in the form of oxide and/or hydroxide.

After the addition of acid is terminated the solution of the calcium salt, in the present instance of calcium nitrate, is evaporated down, and worked up for example in a known manner into calcium nitrate.

The residue, consisting of MgO and of any impurities contained in the starting material, may be utilized or further worked up either immediately or after the carrying out of a further purifying process of the type described above, according to the degree of purity attained after practising the process for the first time.

The term magnesiferous minerals or raw material is used in the following claims to include magnesite and dolomite.

I claim:

1. A method of producing magnesium compounds from magnesiferous minerals, with the aid of mineral acids, which comprises bringing the acid in a gaseous state in contact with the lumpy raw material, in the presence of steam, at a temperature between 100 and 500° C. and at atmospheric pressure, and condensing the steam in the cooler parts of the apparatus so as to obtain a highly concentrated lye by condensation of the steam.

2. A method according to claim 1, with the employment of gaseous hydrochloric acid, wherein the decomposition is effected in the presence of an excess of chlorine sufficient to convert iron and manganese impurities into the higher degree of oxidation for the purpose of separating the same out.

3. A method of producing solutions containing magnesium chloride comprising the steps of contacting lumpy crude ore selected from the group consisting of magnesite and dolomite with hydrochloric acid in a gaseous state in a tower and in the presence of steam, at a temperature between 100 and 500° C. and at atmospheric pressure, condensing the steam in the cooler parts of the tower and to form a highly concentrated lye by dissolving reaction products formed, discharging the lye at the bottom of the tower and returning at least part of it into the top portion of the tower until lye of a desired concentration is formed which when cooled allows pure magnesium salts to crystallize out.

4. A method of producing magnesium compounds which comprises contacting hydrochloric acid in a gaseous state in a tower with lumpy magnesiferous minerals in the presence of steam, at a temperature between 100 and 500° C., and at atmospheric pressure, and condensing the steam in the cooler parts of the tower so as to obtain a highly concentrated lye by condensation of the steam, the said hydrochloric acid being obtained by reacting hydrogen and chlorine, the heat of reaction thereof being employed to preheat the magnesiferous material and to concentrate, by evaporation, the lyes produced.

5. A method of producing highly concentrated solutions of magnesium chloride comprising the steps of introducing hot gaseous hydrochloric acid and steam in a tower filled with lumpy magnesiferous mineral, at the bottom of said tower, and causing the said gas and vapours to move upwardly in the said tower while reacting with the said mineral and condensing the steam, discharging at the bottom of the tower the lye formed in the tower and collected there, and introducing at least part of the lye at the top of the said tower to move downwardly in countercurrent to the rising gas and vapours.

6. A method of producing magnesium compounds comprising contacting hydrochloric acid in a gaseous state with lumpy minerals containing magnesium compounds and calcium compounds in the presence of steam, at a temperature between 100 and 500° C., and at atmospheric pressure, condensing the steam in the cooler parts of the tower so as to obtain a lye containing magnesium chloride and calcium chloride and removing the calcium chloride from the said lye by adjusting its specific gravity to a value of not less than 1.35 and its temperature to not less than 70° C. and precipitating the calcium from the thus prepared lye in the form of calcium sulfate.

ROBERT MÜLLER.